Patented Oct. 11, 1932

1,882,601

UNITED STATES PATENT OFFICE

CHARLES H. HOLLUP, OF CHICAGO, ILLINOIS, ASSIGNOR TO HOLLUP CORPORATION, A CORPORATION OF ILLINOIS

ELECTRODE COATING AND METHOD OF WELDING

No Drawing.   Application filed February 7, 1930.  Serial No. 426,781.

The present invention relates generally to electric welding, and particularly to fluxes useful as coatings for welding electrodes.

With the advent of alloys such as the stainless steels and others, the process of welding as used heretofore, has not been found completely satisfactory, and has been avoided to a considerable extent, giving place to riveting and other mechanical expedients. Because of certain ingredients in the alloys, reactions occur in the arc which cause a poor weld metal. The weld metal may be porous, hard and have inclusions of hard material giving it different characteristics from the surrounding metal of the welded pieces. For example, a chromium steel weld is porous, spongy, hard, non-machinable, and is formed in segregated lumps.

The defects are due to several factors, such as unstability of the arc, open arc flame, and the absence of scavenging agents. Certain of the alloy ingredients readily form oxides which may be refractory, and which may affect the weld metal when included therein.

The object of this invention is to provide a flux which has one or more of the following functions; to stabilize the arc, to protect the arc from the atmosphere, and to dissolve and slag off undesirable oxides in the weld.

A particular object is the provision of such a protective flux as a coating on the electrode.

Various other objects and advantages of the invention will become apparent from the following description and explanation of the invention illustrated particularly by a rod coating in reference to its action on alloy ingredients exemplified by chromium.

The flux employed is one which preferably should have its melting point below the melting point of the alloy, and therefore the ingredients of the flux are selected with this in view.

Chromium is taken as an example of alloying metals in common use, especially in the stainless steels, in order to facilitate an explanation of the invention. Chromium readily oxidizes forming an oxide $Cr_2O_3$ which in the heat of the arc assumes a hard refractory form and exists as inclusions in the weld. An unstable arc aids in producing conditions permitting formation of the oxide. Stabilizing materials are therefore provided for the arc. The atmosphere surrounding the arc readily provides oxygen to material in the weld. Insulating gas is therefore generated as a protection against this. This may arise by the use of combustible material, such as carbon or carbon compounds. Such chromium oxide as may be formed is readily carried away by a suitable flux, acting as a scavenger.

Therefore, in the flux compound there is provided an arc stabilizer, an arc insulating ingredient, and a scavenging agent. Arc stabilizers such as alkaline earth salts may be used. Calcium or barium carbonates or fluorides are examples. The carbonates may provide an insulating gas protection for the arc in the form of carbon dioxide, but this is capable of giving up its oxygen readily. Carbon is therefore used in conjunction with carbonates and both may react together to form the more stable insulating carbon monoxide gas CO. The carbon alone functions equally as well as a protecting agent, drawing oxygen from the air, rather than from carbon dioxide arising in the carbonates. In consequence it is not necessary to use alkaline earth carbonates, so long as an alkaline earth metal is present, as from a fluoride.

The scavenging agents may be alkaline halide fluxes, such as the chlorides and fluorides, these being the most stable fluxing halides. The fluoride is preferred for the reason that fluorides aid in forming lower melting fluxes.

I prefer to use the flux as a coating on the rod which is employed. By so doing I permit these alloys to be welded in the ordinary manner by those ordinarily skilled in welding, who need have no regard for the destructive characteristics of the metal.

Suitable compositions embodying the invention, as a welding electrode coating are:

A. 60% calcium fluoride
  20% sodium fluoride
  20% carbon
B. 60% calcium carbonate
  20% sodium fluoride
  20% carbon.

I do not limit the composition to the proportions given, but these have been found satisfactory. For example, the ingredients may be varied, as follows:

Alkaline earth salts 40% to 80%
Alkaline halide flux 15% to 40%
Carbonaceous material 15% to 40%

It is, of course, understood that other ingredients may be used following the spirit of the invention as above described, and particularly that the invention is not limited to the specific formulae herein disclosed. The ingredients are each representative of a class for the different functions. The carbon, for example, is representative of combustible matter; the calcium fluoride and carbonate are illustrative of arc stabilizer involving alkaline earth metals; and the sodium fluoride is illustrative of an alkaline halide flux or scavenger.

Although I prefer the flux to be embodied in one composition, it will be understood that part of it may be used at the weld and part may be used as a coating on the rod, particularly the removable ingredients such as the carbonaceous material. When used as a coating, it may be applied as a paste to the rod using dextrine, sodium silicate or such materials as a binder.

In view of the fact that the invention may be practiced by applying part of the composition to the rod as a coating, and using the remainder on the weld proper, it is to be understood that the invention contemplates the entire process and composition as expressed in the appended claims.

I claim:

1. An electric welding rod coating having the essential properties of a composition comprising essentially 60% alkaline earth salt, 20% alkaline halide flux, and 20% combustible carbonaceous material.

2. An electric welding rod coating having the essential properties of a composition comprising essentially 60% calcium fluoride, 20% soduim fluoride, and 20% carbon.

In testimony whereof, I have subscribed my name.

CHARLES H. HOLLUP.